April 14, 1953     S. V. PUIDOKAS     2,634,671
AIR CONDITIONING SYSTEM FOR VEHICLES Filed Sept. 6, 1949     2 SHEETS—SHEET 1

INVENTOR.
STANLEY V. PUIDOKAS
BY Carl J. Barker
HIS ATTORNEY

April 14, 1953 S. V. PUIDOKAS 2,634,671
AIR CONDITIONING SYSTEM FOR VEHICLES
Filed Sept. 6, 1949 2 SHEETS—SHEET 2

INVENTOR.
STANLEY V. PUIDOKAS
BY Carl J. Barbee
HIS ATTORNEY

Patented Apr. 14, 1953

2,634,671

UNITED STATES PATENT OFFICE 2,634,671

AIR CONDITIONING SYSTEM FOR VEHICLES

Stanley V. Puidokas, Kenosha, Wis., assignor to Nash-Kelvinator Corporation, Kenosha, Wis., a corporation of Maryland Application September 6, 1949, Serial No. 114,151

5 Claims. (Cl. 98—2)

1

This invention relates to air conditioning systems for vehicles wherein fresh air from outside the vehicle is directed into the vehicle interior through a more or less tortuous path and said air is conditioned before entering the interior of the vehicle.

One problem which presents itself in such a system is the disposition of snow or rain or other foreign matter which enters the system through the air inlet opening.

The principal object of the invention is to provide a novel means of disposing of the rain or snow immediately after its entrance through the inlet opening, thereby preventing moisture from entering the interior of the vehicle.

Other objects and advantages will become apparent upon reading the following specification and upon examination of the drawings in which.

Figure 1:
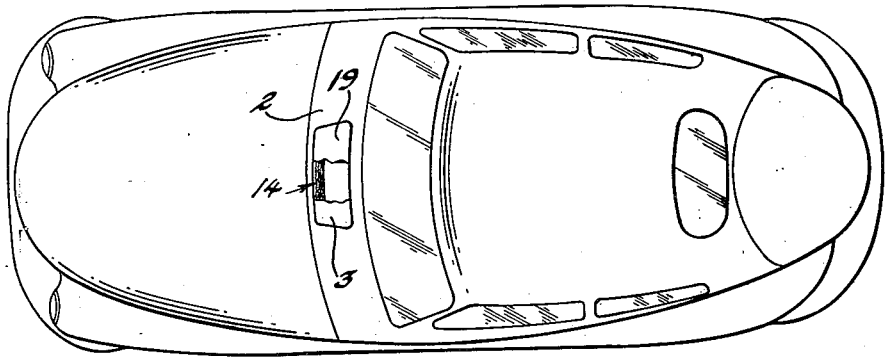
Figure 1 is a plan view of an automotive vehicle with parts broken to disclose the invented subject matter.
Figure 4:
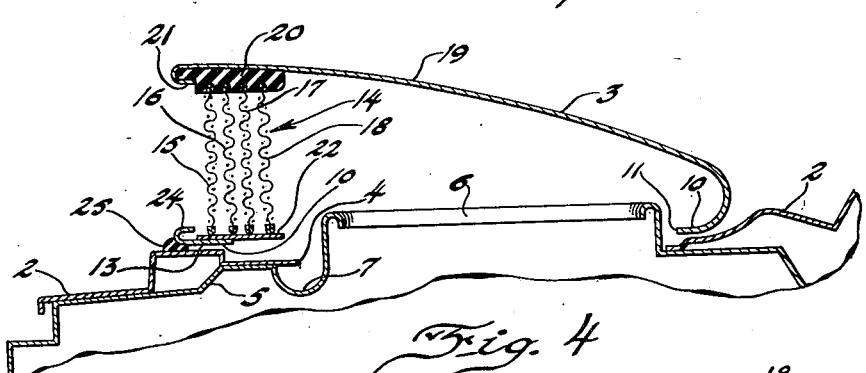
Figure 4 is a sectional view taken on line 4—4 of Figure 2.
Figure 6:
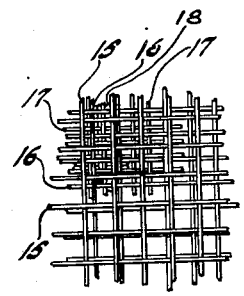
Figure 6 is an enlarged fragmentary front view of the screens.

In the preferred embodiment of the invention I have shown the use of conventional commercially obtainable wire screen material, however, it will be understood that some other form of perforated material may be used and may be arranged in face to face fashion with each sheet being spaced from the preceding and/or succeeding sheet.

I have shown my invention as it may be used with an automotive vehicle wherein the vehicle cowl 2 may be provided with an air intake housing 3 which is welded or otherwise secured to the cowl. The cowl 2 has an opening 4 and a cover member 5 may be mounted beneath the cowl (the cover 5 may be formed as a cover for cowl (the cover 5 may be formed as of the type which a hopper, not shown, such as of the type which is disclosed in my co-pending application, Serial Number 114,123, filed September 6, 1949). The cover member 5 is provided with an upwardly extending mouth 6 which serves as the opening through which air passes into the air conditioning system and thence into the vehicle interior. If desired, I may provide a lid operable by a

2 lever located within the vehicle interior, which lid may be utilized to close off the opening 6 in a conventional manner, however, I have not disclosed this construction in the drawings as it forms no part of the subject matter of this invention.

Figure 5:
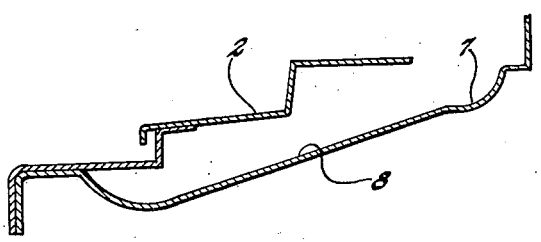
Figure 5 is a sectional view taken on line 5—5 of Figure 2, some of the parts being omitted.
Figure 2:
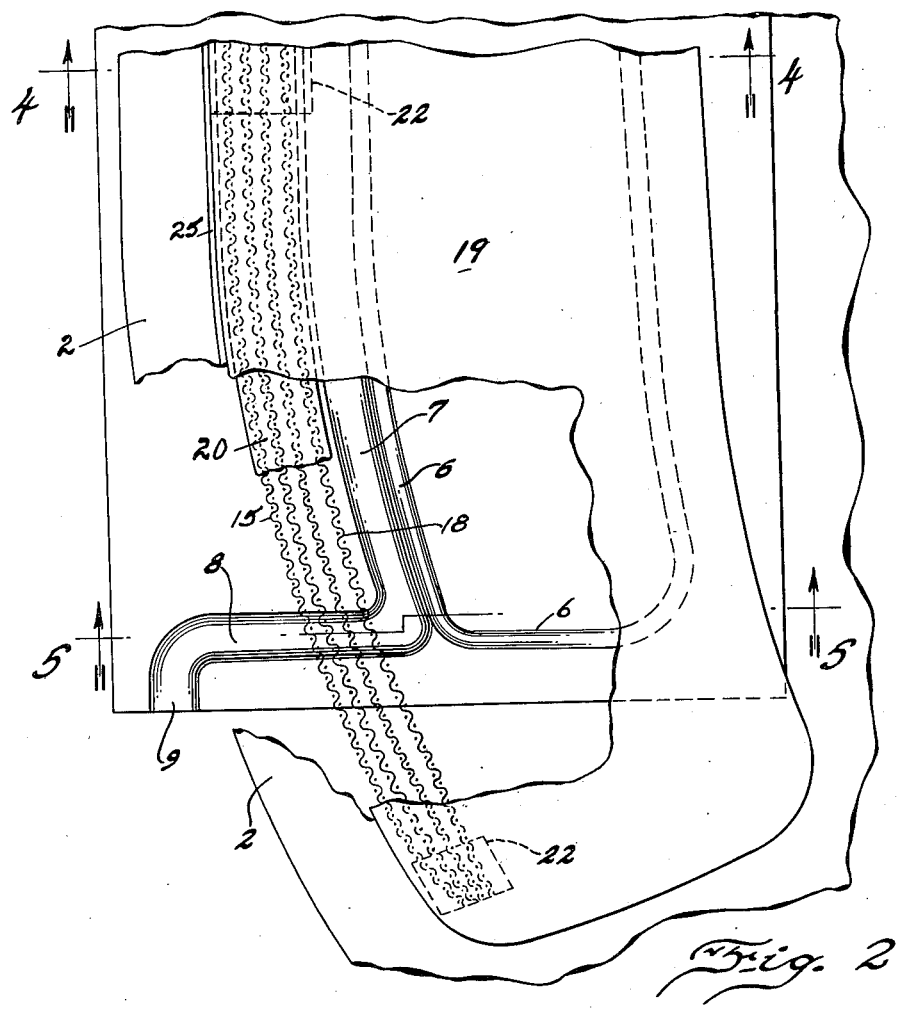
Figure 2 is a fragmentary plan view showing the detailed construction of my device.
Figure 3:
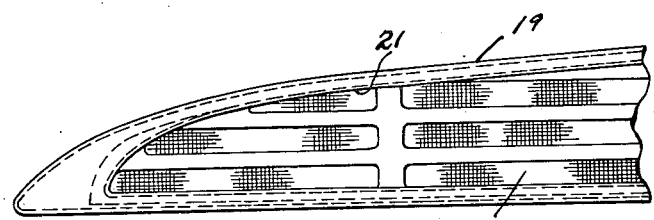
Figure 3 is a partial front view of the air intake opening.

The cover member 5 has a longitudinally extending trough 7 which continues transversely with a downwardly sloped portion 8 and which ultimately terminates with an outlet mouth 9. The mouth 9 is located forwardly of the cowl 2 so that rain water and other foreign elements which have accumulated in trough 7 are ultimately expelled on the engine compartment side of the dash panel (not shown). The downwardly sloped portion 8 of trough 7 is best shown in Figure 5.

The air intake housing 3 may be provided with a top portion 19 shaped in a decorative manner and the bottom wall 10 of the air intake housing is provided with an opening 11 to accommodate the upwardly extending mouth 6 of cover member 5. The front ledge 13 of the bottom wall 10 extends throughout the length of the air intake housing 3 and accommodates the screen assembly 14. The screen assembly 14 may consist of a series of wire screens mounted face to face relative to each other and in quite close proximity to each other. I preferably use screens of varying mesh, for example, the front screen 15 may have a coarse mesh whereas the succeeding screens 16, 17, and 18, may have a finer mesh. By varying the mesh of the screens and by using a multiplicity of screens, such, for example, as four layers as shown in the drawings, it is possible to wind up with a composite screen assembly wherein there are no straight line passages through the composite structure. That is, for example, if one were to look directly into the air intake housing in horizontal fashion there would be no "straight through" passages visible to the eye. In other words, whenever any water, air, or other elements pass through the composite screen structure it is necessary for such water, air, or other elements to pass through the composite structure by taking a tortuous path. Incoming air will travel the tortuous paths with little difficulty, however, any solid or liquid elements passing through the composite structure ultimately encounter the wire screens and in the case of rain water, the rain drops are broken up into tiny particles whose speed of travel is virtually negligible by the time the minute particles reach the last screen 18, and the water accumulates in trough 7 from whence it is ultimately expelled at outlet 9. Thus the air which enters air intake housing 3 passes through the composite screen structure 14 in a tortuous fashion and when it reaches the opening 6 it at most is in the form of moistened air, which is not undesirable.

The screens may be embedded in a rubber-like moulding strip 20, which may be molded or otherwise secured within the inwardly turned flange portion 21 of air intake housing 3. The lower longitudinal edges of the screens may be welded or otherwise secured to spaced plates 22, which plates are in turn welded or otherwise secured to the lower wall 19 of air intake housing 3. It is desirable to position the lower longitudinal edges of, for example, the first two screens 15 and 16 so that the lower longitudinal edges of these screens may be welded or otherwise secured in direct and close contact with the upper face of ledge 13, thereby avoiding undesirable crevices.

The upper longitudinal edges of the screens being embedded in the rubber-like strip 20 avoids the occurrence of any crevices along the upper longitudinal edges of said screens. The front lower flange 24 of housing 3 may be mounted in a rubber-like molding strip 25, thereby preventing any crevices at this point.

It will be understood that there may be various other ways to mount the series of screens in the mouth of the air intake housing 3 and I do not wish to be limited to the type of mounting disclosed herein.

Having thus described my invention, what I claim is:

1. A water dispensing device for an air conditioning system of a vehicle, comprising a cover member having an opening for establishing communication between the interior of the vehicle and the atmosphere, an air intake housing mounted above the cover member and having a mouth exposed to the atmosphere for initial air reception, a series of perforated screens arranged one behind the other within the air intake housing and spanning the housing mouth, said screens being located between the mouth of the air intake housing and the cover member opening and a drainage pan mounted rearwardly and beneath the screens and forwardly of the cover member opening and having drainage communication without the vehicle interior.

2. A water dispensing device for an air conditioning system of a vehicle, comprising a cover member having an opening for establishing communication between the interior of the vehicle and the atmosphere, an air intake housing mounted above the cover member and having a mouth exposed to the atmosphere for initial air reception, a series of sieve members mounted within the air intake housing one behind the other and spanning the mouth of the housing, said sieve members being located between the mouth of the air intake housing and the cover member opening, the interstices of some of the sieve members being misaligned relative to the interstices of the succeeding sieve members and a drainage pan mounted rearwardly and beneath the sieves and forwardly of the opening and having drainage communication outside of the interior of the vehicle.

3. A moisture disposal device for an air conditioning system of a vehicle having a cover member with an opening for establishing communication between the interior of the vehicle and the atmosphere, an air intake housing mounted above the cover member opening and having a mouth for initial air reception, a multiplicity of screens with different meshes mounted in laminated fashion in the mouth and spanning the cross sectional area of the mouth and a disposal member mounted beneath the screens and ahead of the atmospheric opening with respect to the screens.

4. A disposal device for an air conditioning system of a vehicle, comprising a cover member separating the interior of the vehicle from the atmosphere and having an opening, an air intake housing above the opening and having a mouth exposed to the atmosphere, a multiplicity of screens mounted in face to face spaced relation to each other and spanning the mouth and a disposal member positioned rearwardly with respect to the screens and forwardly with respect to the cover opening.

5. A water dispensing device for an air conditioning system of a vehicle comprising a panel having an opening therein for establishing communication between the interior of the vehicle and the atmosphere, an air intake housing mounted over the panel, said housing having a roof portion spaced from and overhanging the panel opening, said air intake housing having a mouth for initial reception of incoming atmospheric air, said mouth being exposed adjacent to and forwardly of the panel opening, a multiplicity of perforated screens mounted interiorly of the air intake housing in face to face relation to each other and rearwardly of the mouth with reference to the panel opening, a trough formed in the panel member in a position gravitationally lower than the perimeter of the panel opening and forwardly of said opening relative to the screen members and rearwardly of said screen members relative to the panel opening.

STANLEY V. PUIDOKAS.

References Cited in the file of this patent

UNITED STATES PATENTS

| Number | Name | Date |
|---|---|---|
| 1,474,075 | Gallaugher | Nov. 13, 1923 |
| 1,642,319 | Zoller | Sept. 13, 1927 |
| 1,643,966 | Swartwout | Oct. 4, 1927 |
| 1,676,191 | Jordahl | July 3, 1928 |
| 2,152,414 | Knight | Mar. 28, 1939 |
| 2,198,156 | Findley | Apr. 23, 1940 |
| 2,367,904 | Ulrich | Jan. 23, 1945 |

FOREIGN PATENTS

| Number | Country | Date |
|---|---|---|
| 457,964 | Great Britain | Dec. 9, 1936 |